US006873654B1

(12) United States Patent
Rackett

(10) Patent No.: US 6,873,654 B1
(45) Date of Patent: Mar. 29, 2005

(54) METHOD AND SYSTEM FOR PREDICTIVE CONTROL FOR LIVE STREAMING VIDEO/AUDIO MEDIA

(75) Inventor: Albert E. Rackett, Milpitas, CA (US)

(73) Assignee: Redrock Semiconductor, Inc, Sunnyvale, CA (US)

( * ) Notice: Subject to any disclaimer, the term of this patent is extended or adjusted under 35 U.S.C. 154(b) by 515 days.

(21) Appl. No.: 09/858,340

(22) Filed: May 15, 2001

Related U.S. Application Data

(60) Provisional application No. 60/204,911, filed on May 16, 2000.

(51) Int. Cl.[7] .................................. H04N 7/12
(52) U.S. Cl. .................................. 375/240.03
(58) Field of Search .................. 375/240.02, 240.03, 375/240.22; 348/404.1, 424.2; 382/239, 251, 253; H04N 7/12

(56) References Cited

U.S. PATENT DOCUMENTS

| | | | | | |
|---|---|---|---|---|---|
| 5,196,931 | A | * | 3/1993 | Kondo .................. | 375/240.24 |
| 5,493,513 | A | * | 2/1996 | Keith et al. .................. | 709/247 |
| 5,606,371 | A | * | 2/1997 | Klein Gunnewiek et al. .................. | 375/240.03 |
| 5,864,583 | A | * | 1/1999 | Ozkan .................. | 375/242 |
| 6,088,392 | A | * | 7/2000 | Rosenberg .................. | 375/240.03 |
| 6,188,792 | B1 | * | 2/2001 | Chujoh et al. .................. | 382/236 |
| 6,415,057 | B1 | * | 7/2002 | Suzuki et al. .................. | 382/239 |
| 6,539,124 | B2 | * | 3/2003 | Sethuraman et al. .................. | 382/251 |
| 6,664,913 | B1 | * | 12/2003 | Craven et al. .................. | 341/200 |

* cited by examiner

Primary Examiner—Nhon Diep
(74) Attorney, Agent, or Firm—William L Paradice III

(57) ABSTRACT

A technique for digital video processing in a predictive manner is provided. In one embodiment, a method for processing digital video signals for live video applications comprises providing video data that comprise a plurality of frames, identifying a first frame and a second frame in the frame sequences, and processing the information of the first frame and the information of the second frame to determine a quantization step for the second frame. The step of processing the information of the first frame and the information of the second frame further comprises calculating a sigmaSAD value for the second frame, calculating a divisor value for the second frame, and calculating the quantization step for the second frame. In another embodiment, a system for processing digital video signals for live video applications comprises a memory unit within which a computer program is stored. The computer program instructs the system to process digital video in a predicative manner. In yet another embodiment, a system for processing digital video signals for live video applications comprises various subsystems that together process digital video in a predictive manner.

16 Claims, 7 Drawing Sheets

METHOD AND SYSTEM FOR PREDICTIVE CONTROL FOR LIVE STREAMING VIDEO/AUDIO MEDIA

This application claims benefit of 60/204,911 filed May 16, 2000.

BACKGROUND OF THE INVENTION

The present invention relates generally to digital data processing of video information. More particularly, the invention provides techniques, including methods and systems, for encoding video information.

The video information is usually transmitted from a video provider to a video user over a transmission system, such as a transmission line or a wireless network. The video information includes motion pictures, live news broadcasts, and real-time information updates. The video provider can be, among others, an Internet service provider, a videoconference participant, an entertainment service provider, or a news agency. The video user is, among others, an Internet service subscriber, a videoconference participant, a video-enabled cellular phone user, a CODE C user, a PALM user, or a user of any other types of handheld devices that possess the video capability.

The transmitted video information usually comprises thousands of frames, each of which is composed of numerous microblocks. Each microblock usually represents one pixel of the image illustrated in a frame, and comprises multiple bits of data. During the transmission, each frame lasts from about 25 to 30 msec in order to generate a continuous motion effect for the video viewer. The unencoded video information hence needs an average transmission rate of millions of bits per second. In addition, because various frames may contain drastically different amount of data, the required transmission rate could vary between different frames.

In contrast, at the hardware level, the transmission rate of the transmission system is usually much lower than millions of bits per second, and it usually does not vary with time. This limited transmission rate cannot typically support the unencoded transmission of the video information; therefore the video data must be encoded in order to reduce the required transmission rate.

The required transmission rate of the encoded data on the average needs to be equal to or smaller than the transmission rate of the transmission system. However, if the video date are overly compressed, video images that the viewer sees after the transmission may not possess a satisfactory quality. Furthermore, if the required transmission rate for the encoded video data drops below the transmission rate of the transmission system, the unused transmission capacity is filled with meaningless information, and is wasted. Hence, the optimization of encoding parameters is critical for transmitting high quality video images with the limited transmission rate.

The search for the optimal encoding parameters is complicated by the significant variation in data size of various frames. With current encoding schemes, encoded video data have file sizes that are not strictly proportional to the number of microblocks in each frame, but rather proportional to the spatial complexity and motion activity of the image. The various frames, if encoded with the same set of parameters, may require different transmission rates, but the transmission rate of the transmission system is fixed. Therefore the optimal encoding parameters vary frame by frame.

One method for determining a set of encoding parameters for each frame includes a buffer that stores the encoded data prior to their transmission over the transmission system. When the incoming rate of the encoded data is higher than the transmission rate of the transmission system, the buffer stores the incoming data. As the buffer fills, the encoding parameters are adjusted so that the transmission rate for the subsequent encoded data is reduced. If the encoding parameters are not adjusted, the buffer will eventually overflow, and consequently the incoming data would be irretrievably lost. On the other hand, when the coming rate of the encoded data falls below the transmission rate of the transmission system, the buffer maintains its output rate at the transmission rate of the transmission system. Similarly, the encoding parameters are adjusted to raise the transmission rate of the future subsequent encoded data. If the encoding parameters are not adjusted, the filled percentage of the buffer would drop below a predetermined level, and would have to be filled with bits of random data to prevent the crash of the encoding system. In short, the adjustment triggered by the buffer can compensate the adverse effects resulting from buffer underrun and overrun.

A drawback to this method is that the buffer cannot completely solve the problem associated with the lack of optimization. The adjustment of the encoding parameters based on the buffer fullness is predicated upon the dubious assumption that future frames have similar complexity as previous frames. In reality, this inference of future behavior based on recent historical data is often incorrect. Under this assumption, a simple image following a complicated frame would be overly compressed at the expense of image quality, and a complex image following a simple frame can be under compressed and thus fills up the buffer.

Another drawback is that large buffers are required. In particular, a very large buffer may be used to allow a significant rate mismatch between the required encoded data transmission rate and the transmission rate of the transmission system over an extended period without using a complicated rate control algorithm. However, the large buffer increases the cost of the transmission system, and introduces a great deal of testing. Such added latencies delay are unsuitable, especially for communications between parties responding to each other interactively, such as for a video conferencing system.

Some other methods for solving the rate mismatch problem include making adjustments based on historical data and the fullness of the buffer, however, this solution cannot solve the problems related to the lack of intra-frame optimization. For example, under these methods, the modifications to the encoding parameters often create a cyclic effect undesirable for videoconferencing. In a videoconference, the scene is usually composed of a very simple background at the top of the frame, talking heads with increased motion in the center, and hands manipulating objects on a table top at the bottom of the frame. As an encoder processes the simple background at the top of the frame, the compression becomes more and more compact in order to compensate for the accumulated buffer fullness. By the time the table top is reached, the objects to which the speaker is drawing the viewer's attention are overly compressed, and are poorly represented.

In order to solve the problems related to the lack of the optimization, past researchers have suggested various methods, such as MPEG-4 Standard (See IISO/IEC FDIS 14496-2, Annex L), for analyzing the date content of the video frames before they are encoded. However, these methods require complex mathematical operations, and are not suitable for fast encoding on a low-speed microprocessor.

In summary, highly desirable is a predictive encoding technique that, based on the complexity of the future frame, adjusts the encoding parameters and utilizes only simple mathematical manipulations.

SUMMARY OF THE INVENTION

According to the present invention, a technique for digital video processing is provided. In exemplary embodiments, the present invention provides methods and systems for processing digital video data in a predictive manner for live video streaming applications.

In one embodiment, a method for processing digital video signals for live video applications may include providing video data that comprise a plurality of frames, identifying a first frame and a second frame in the frame sequences, and processing the information of the first frame and the information of the second frame to determine a quantization step for the second frame. The step of processing the information of the first frame and the information of the second frame may include calculating an average of a sum of absolute differences (sigmaSAD) value for the second frame, calculating a divisor value for the second frame, and calculating the quantization step for the second frame.

In another embodiment, a method for processing digital video signals for live video application may include deciding whether to encode a frame in the I-mode before any P-frame encoding is accomplished.

In yet another embodiment, a method for processing digital video signals for live video application may include adjusting the complexity integer so that the size of encoded data for anyone of the plurality of frames has approximately an equal size.

In yet another embodiment, a method for processing digital video signals for live video application may include determining the locations of I-frames in the step of providing video data, extending frames immediately preceding the I-frames for one additional frame time, and skipping frames immediately following the I-frames.

In yet another embodiment, a system for processing digital video signals for live video applications comprises a memory unit within which a computer program is stored. Functions of the computer program may include instructing the system to provide video data comprising a plurality of frames, instructing the system to identify a first frame and a second frame in the frame sequences, and instructing the system to process the information of the first frame and the information of the second frame to determine a quantization step for the second frame.

In yet another embodiment, a system for processing digital video signals for live video applications is disclosed. The system may include a video providing subsystem that provides video data comprising a plurality of frames, a sigmaSAD calculation subsystem that calculates a value of sigmaSAD, and a divisor calculation subsystem that calculates a value of divisor.

DESCRIPTION OF THE SPECIFIC EMBODIMENTS

According to the present invention, techniques including methods and systems for digital video processing are provided.

Figure 1:
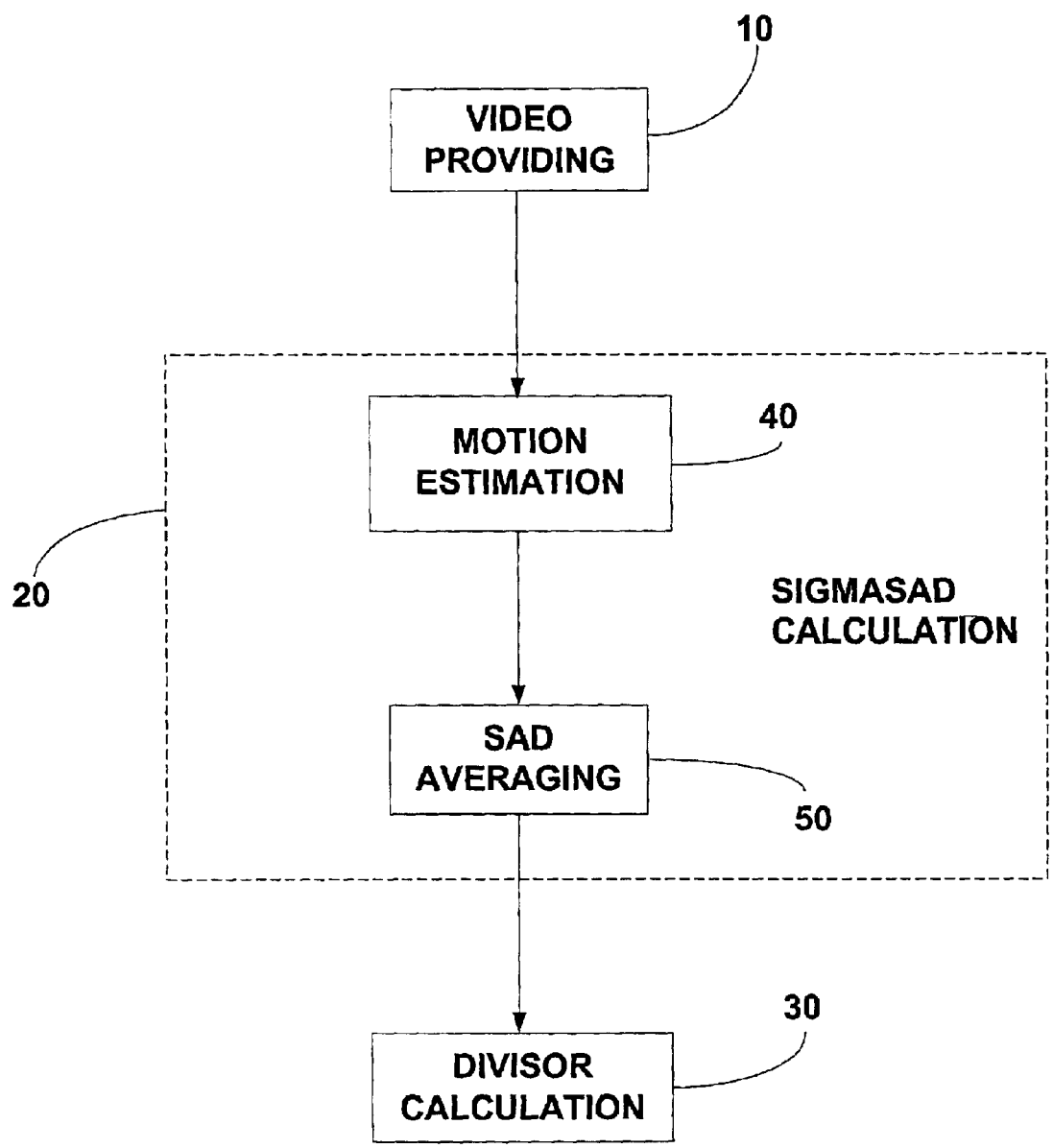
FIG. 1 illustrates a block diagram for a method for processing digital video signals according to an embodiment of the present invention.

FIG. 1 illustrates a block diagram according to an embodiment of the present invention. The inventive method comprises three steps: a video providing step 10, a sigmaSAD calculation step 20, and a divisor calculation step 30.

In the video providing step 10, a stream of video frames is provided. The video data may be derived from live video data, pre-recorded video data, or the like. Various video frames are assigned or labeled to various compression modes, such as I, P or B. These compression modes significantly affects the size of the compressed data, irrespective the encoding parameters that are to be selected in the next two steps.

The SigmaSAD calculation step 20 comprises a motion estimation step 40 and a sum of absolute differences (SAD) averaging step 50. In the motion estimation step 40, the optimal motion vector for each microblock of a current frame is determined by methodically searching for the vector yielding the smallest difference between a current microblock and a microblock in a previous frame. The resulting figure of merit is called the sum of absolute differences (SAD). Once the SAD value for a microblock is determined, it is written to a unit of a reference memory. In the reference memory, each unit typically corresponds to one microblock, and each microblock of the current frame corresponds to one unit. For example, if the current frame consists of 99 quarter common interface format (QCIF) microblocks, the reference memory stores 99 SAD values.

In the SAD averaging step 50, the SAD values for all of the microblocks of the current frame is summed up, and the sum is then divided by the total number of microblocks. Thee resulting value is called sigmaSAD. Since the sigmaSAD value of a frame must be calculated before the encoding of any microblocks in the frame, the first encoded microblock would be delayed by the duration of the motion estimation step 40. For example, if the encoder can process 30 frames per second, the delay would amount to only less than 20 msec.

In the divisor calculation step 30, a divisor for each frame is determined. The divisor is defined as the ratio between sigmaSAD and a quantization step value (Q) or the ratio between sigmaSAD and the sum of Q and a constant. The constant may be set to −1. In the present embodiment, SigmaSAD has been determined to be an accurate predictor for the frame complexity for a large number of standard QCIF sequences. Experimentally, the Pearson product-moment correlation between sigmaSAD and the unencoded data size of a frame (hereinafter "unencoded frame size") was found to be approximately 0.9.

Even though sigmaSAD correlates with the unencoded frame size, sigmaSAD does not vary linearly with the unencoded frame size. Further, Q responds nonlinearly with the unencoded frame size. The non-linearity of sigmaSAD and that of Q closely match each other. More specifically, a small variation in small sigmaSAD and a small change in small Q can both make large changes in encoded data size, and the converse relationship holds true for both high sigmaSAD and high Q. Therefore sigmaSAD and Q change almost linearly with each other for a given encoded data size. Although the relationship between sigmaSAD and Q can be even more precisely described by a complicated nonlinear formula, the linearity or the modified linearity by replacing Q with Q plus a constant, adopted in the present embodiment has generated satisfactory results, where Q varies in value from 2 through 31.

The determined divisor remains constant throughout the entire frame, but it may change with various frames. After a divisor is selected for one frame, if a subsequent frame contain the same scene, i.e. the same spatial complexity, and contains changes only in motion complexity, the divisor usually changes very little.

For example, the instant embodiment may employ a set of 16 potential divisor values, which are indexed from 0 through 15 and may range from a value suitable for simple images to one that can handle complex scenes. To encode QCIF at ten frames per second, the set of divisor values can be chosen from a series of quotients ranging from 64 to 264. In order to choose a particular divisor value, an integer is selected such that its quotient modulo 16 is the divisor index, and this integer is called complexity integer. For every I-frame, the complexity integer is set to a value midrange between 0 and 255. In subsequent P-frames whose scenes do not change significantly, the complexity integer may be adjusted if the buffer fullness deviates from the targeted fullness.

The magnitude of the adjustment increases with the difference between the buffer fullness and the targeted fullness. The resulting change in the complexity integer occurs usually gradually; hence, the divisor also changes only gradually for frames possessing almost the same spatial complexity. The divisor value determined through the complexity integer is then used to calculate the Q value for the frame. The Q value equals the ratio of the sigmaSAD value to the divisor value, or equals the difference between the ratio of the sigmaSAD value to the divisor value and a constant, where the constant may be set to −1. This process would be repeated for each frame in the incoming video stream before each frame is encoded.

In any event, if the buffer fullness approaches its maximum level and is beyond the control through the adjustment of the complexity integer, the subsequent frames would be "skipped," effective alleviating the fullness of the buffer.

Figure 2:
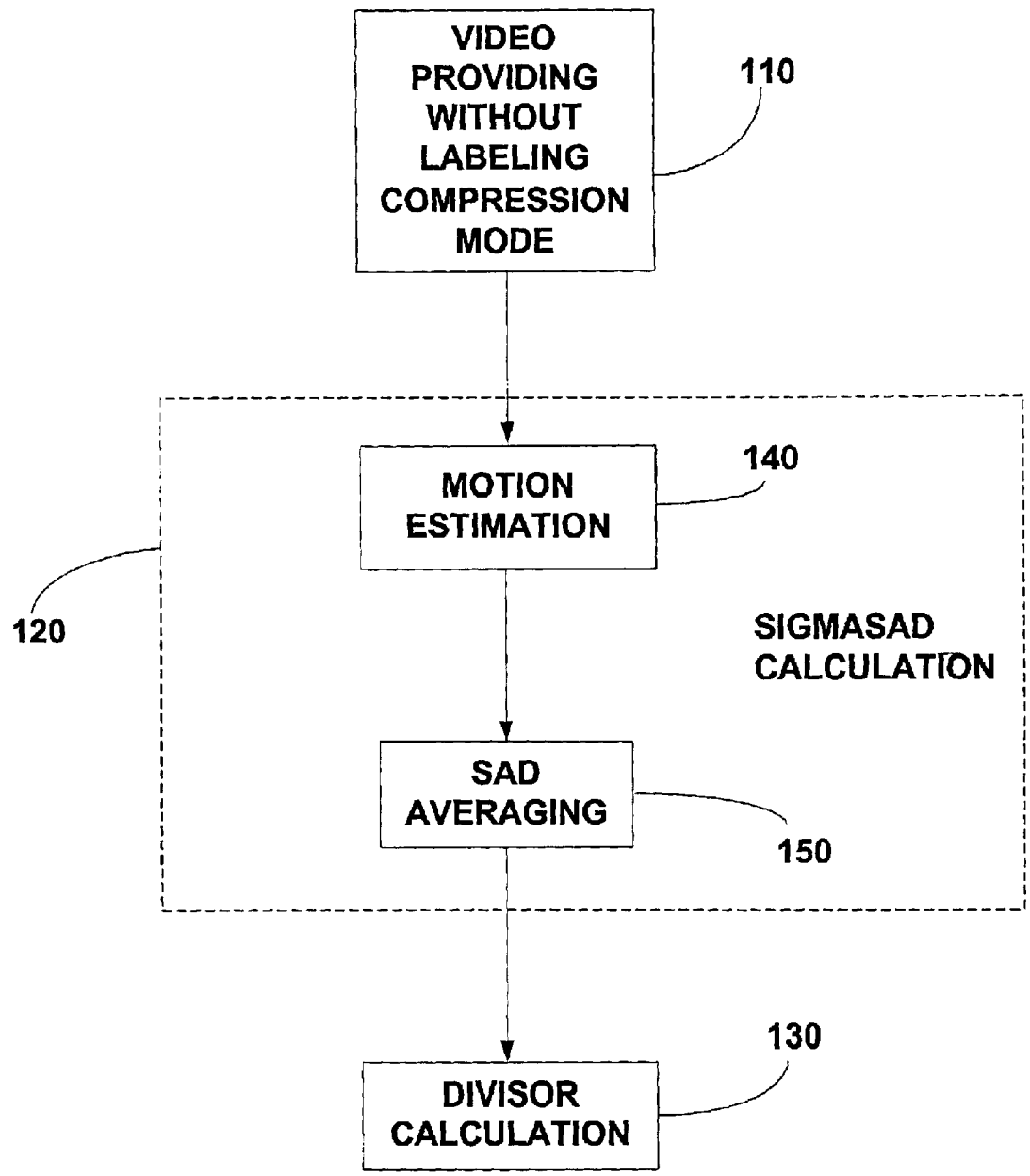
FIG. 2 illustrates a block diagram for a method for processing digital video with the capability of advance determination of I-mode frames according to an embodiment of the present invention.

FIG. 2 illustrates a block diagram according to another embodiment of the present invention. The inventive method comprises three steps: a video providing step 110, a sigmaSAD calculation step 120, and a divisor calculation step 130.

In the video providing step 110, the unencoded video frames are transmitted into an encoding system, without labeling various video frames with different compression modes, such as I, P or B.

The SigmaSAD calculation step 120 comprises a motion estimation step 140 and a SAD averaging step 150, similar in function as discussed above. During the motion estimation process, however, the changes of a sequence of frames in spatial complexity and in motion complexity can be determined with skills well known in the art. Hence the decision to encode a frame in the I-mode can be made before any P-frame encoding has actually been accomplished. This is a far more efficient processing sequence than encoding microblocks in a purely sequential manner.

Figure 3:
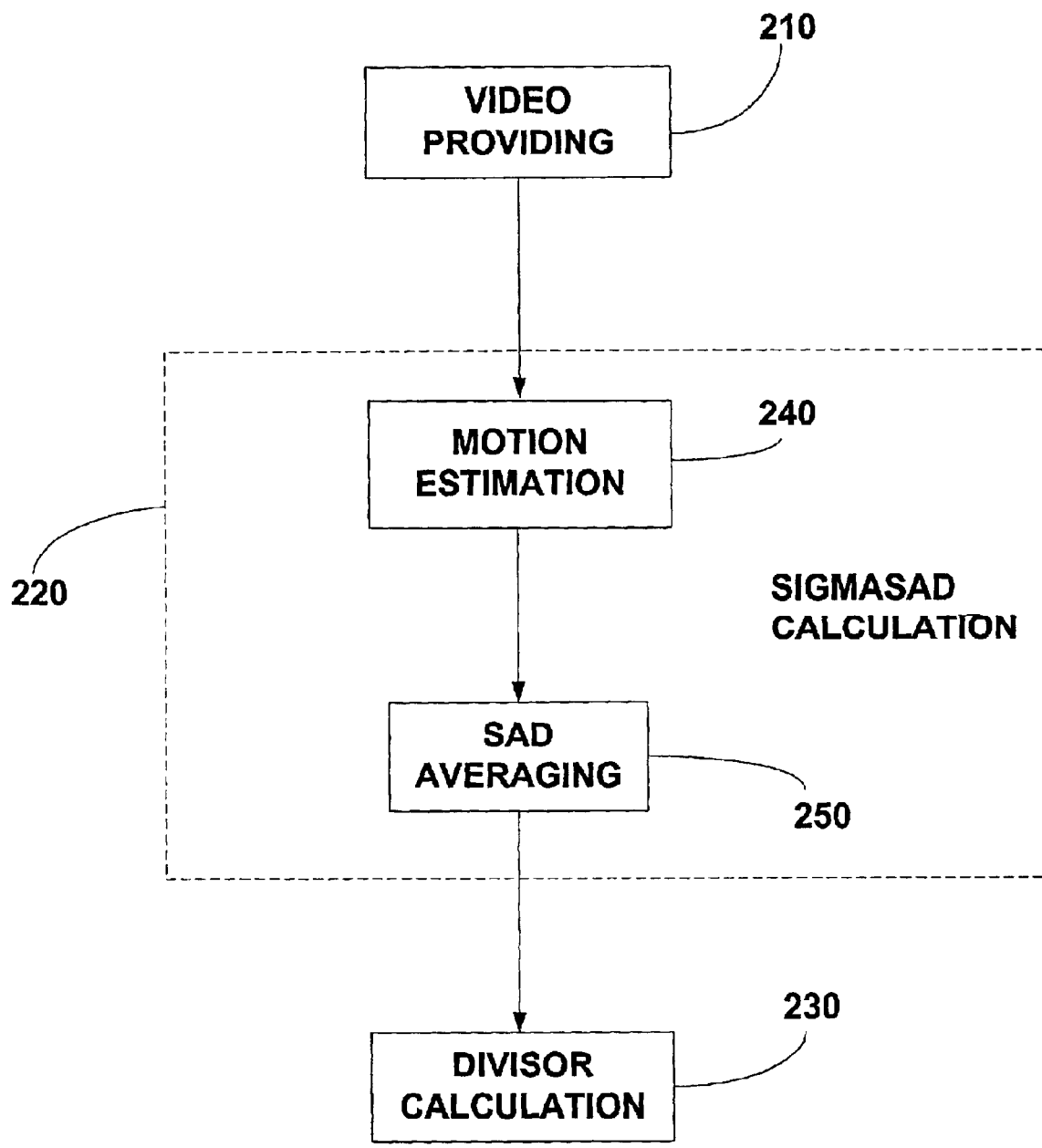
FIG. 3 illustrates a block diagram for a method for processing digital video with the capability of ensuring an approximately same size for encoded data of various frames according to an embodiment of the present invention.

FIG. 3 illustrates a block diagram according to yet another embodiment of the present invention. The inventive method comprises three steps: a video providing step 210, a sigmaSAD calculation step 220, and a divisor calculation step 230.

In the video providing step 210, a stream of video frames is provided. Furthermore, various video frames are assigned to various compression modes, such as I, P or B. These compression modes significantly affects the size of the compressed data, irrespective the encoding parameters that are to be selected in the next two steps.

The SigmaSAD calculation step 220 comprises a motion estimation step 240 and a SAD averaging step 250, substantially similar to that discussed above.

In this embodiment, for subsequent P-frames, the complexity integer may be adjusted so that the size of the encoded data for various frames would have approximately the same size. In order to achieve approximately the same size, frames with simple spatial complexity and motion complexity use small Qs, which would enable the frames to possess a high image quality. On the contrary, complex frames use large Qs; thus the image quality is reduced. However, a high image quality is not important typically for complex frames because these complex frames typically occur after a dramatic change in scenery and when the human eye-brain system cannot comprehend the details of an image.

Figure 4:
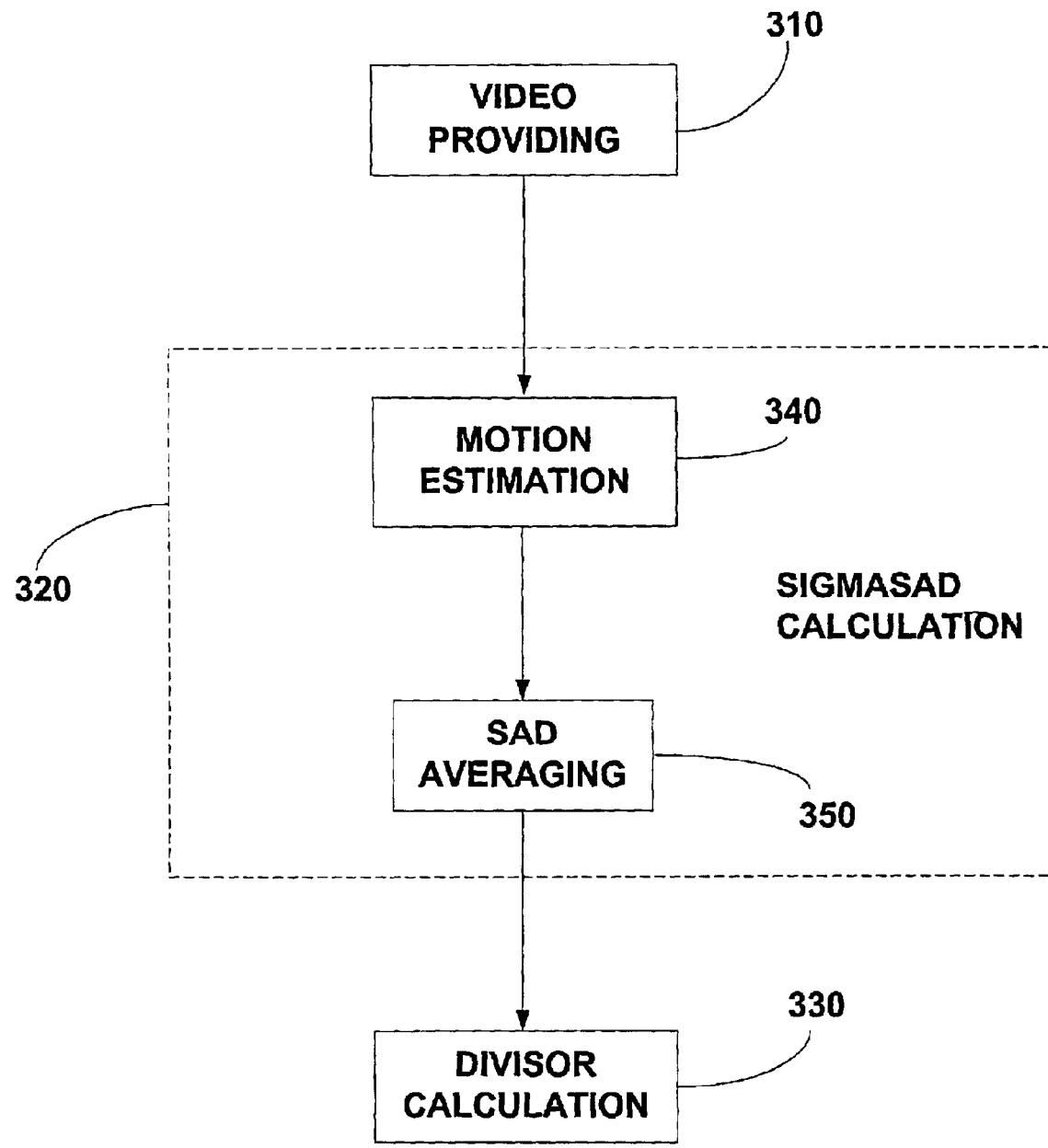
FIG. 4 illustrates a block diagram for a method for processing digital video with the capability of maintaining high video quality while skipping frames according to an embodiment of the present invention.

FIG. 4 illustrates a block diagram according to yet another embodiment of the present invention. The inventive method comprises three steps: a video providing step 310, a sigmaSAD calculation step 320, and a divisor calculation step 330.

In the video providing step 310, a stream of video frames is provided. Furthermore, various video frames are assigned to various compression modes, such as I, P or B. These compression modes significantly affects the size of the compressed data, irrespective the encoding parameters that are to be selected in the next two steps.

The SigmaSAD calculation step 320 comprises a motion estimation step 340 and a SAD averaging step 350 as discussed above.

In this embodiment to reduce the buffer fullness, a frame immediately following an I-frame can be skipped, because following a dramatic scenery change in an I-frame, the human eye-brain system cannot comprehend images in any detail. The locations of the I-frames are usually determined in the video providing step 310. To compensate for the skipped frames, the frames immediately preceding the I-frames, instead of the I-frames that are coded with large Qs and possess low image quality, would be extended for one more frame time, where one frame time is defined as the display duration of each frame.

In any event, if the buffer fullness approaches its maximum level and is beyond the control through the adjustment of the complexity integer, the subsequent frames would be "skipped," effective alleviating the fullness of the buffer.

Figure 5:
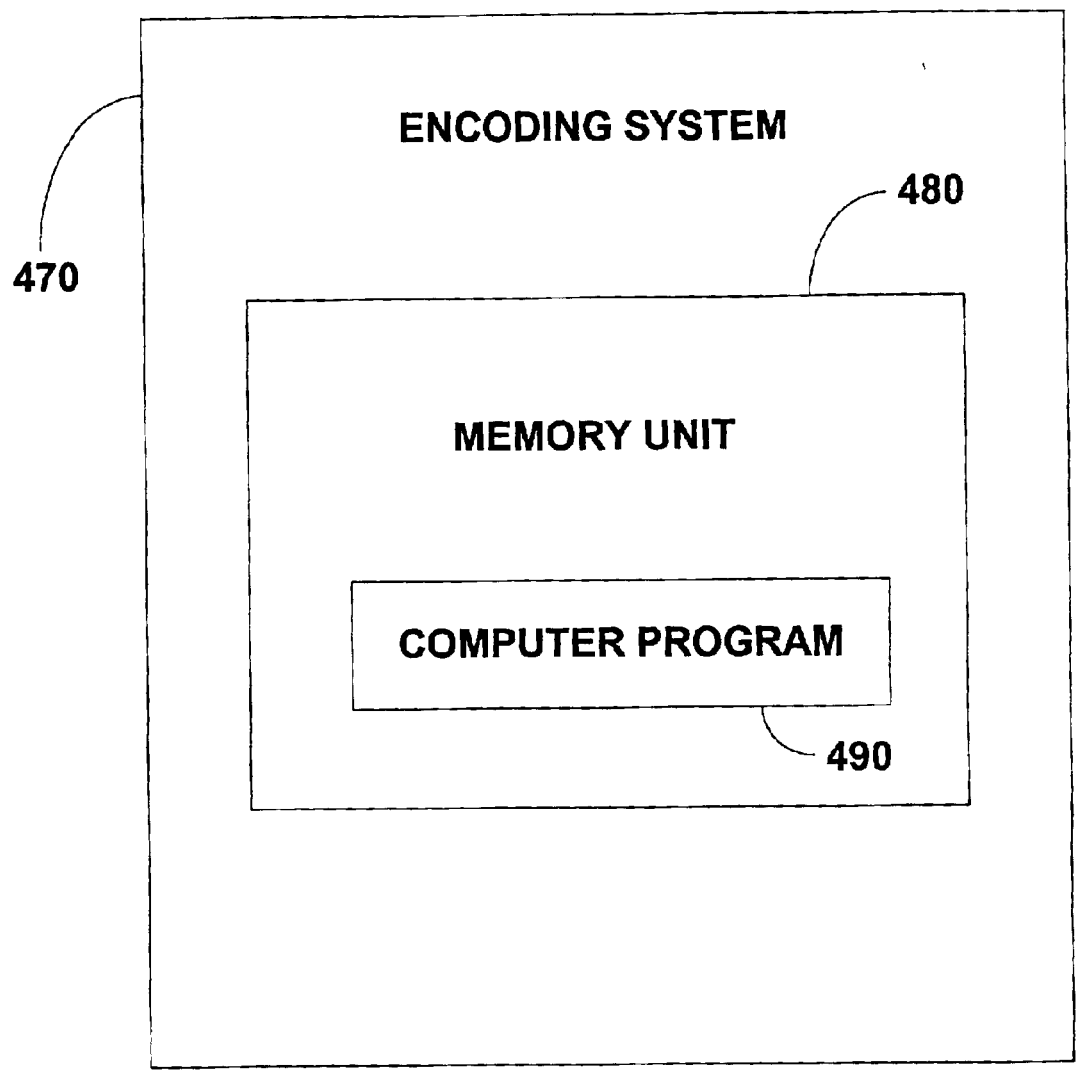
FIG. 5 illustrates a block diagram for a system of processing digital video with a subsystem that contains a computer control program according to an embodiment of the present invention.
Figure 6:
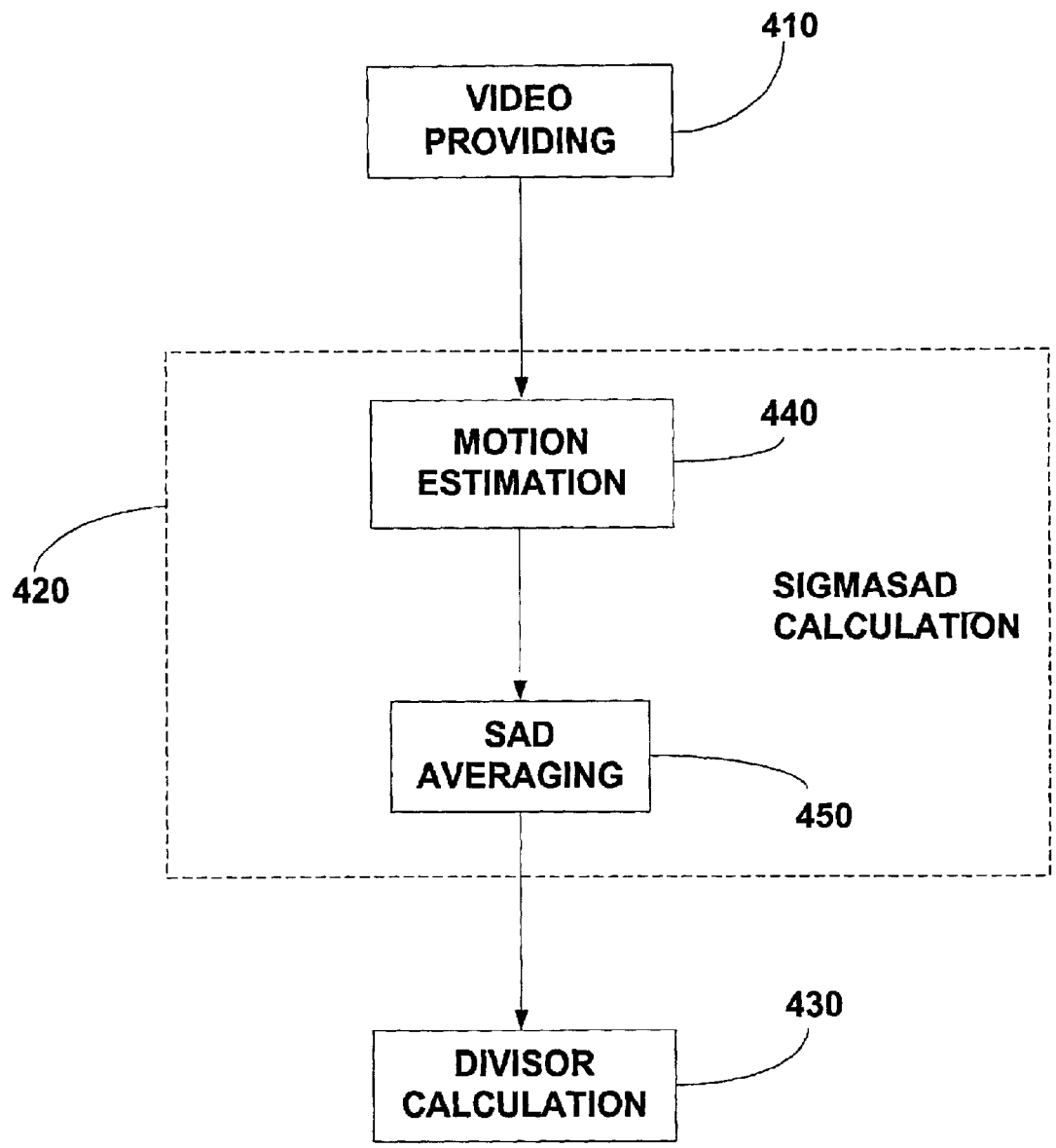
FIG. 6 illustrates a block diagram for the various functions of the computer control program according to an embodiment of the present invention.
Figure 7:
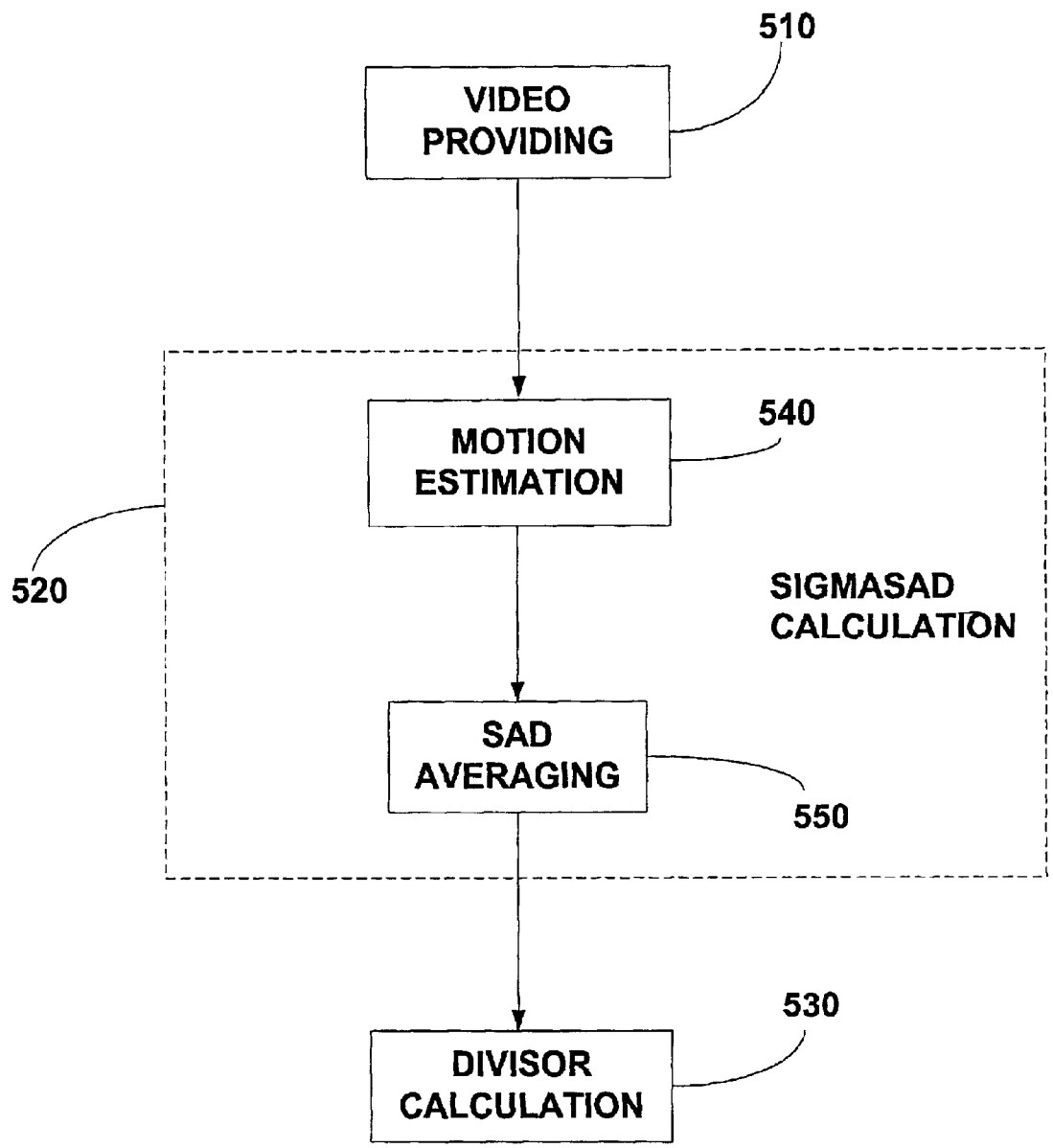
FIG. 7 illustrates a block diagram for a system of processing digital video with subsystems that performs various processing steps according to an embodiment of the present invention.

FIG. 5 illustrates a block diagram according to an embodiment of the present invention. The inventive encoding system 470 comprises a memory unit 480, within which a computer program 490 is stored.

The computer program 490 instructs the system 470 to perform an encoding process comprising three functions: a video providing function, a sigmaSAD calculation function, and a divisor calculation function.

In the present embodiment, the system 470 may be a computer system, a custom processing chip, or other device including memory and a processor. The video providing function provides a stream of video frames. These frames may be from a video camera, from a hard disk, CD-ROM, DVD-ROM, or the like. Furthermore, the video providing function assigns various video frames to various compression modes, such as I, P or B.

The processor may be configured to perform the sigmaSAD calculation function including motion estimation and SAD averaging, and the divisor calculation function based upon video data, as discussed above. In alternative embodiments, dedicated hardware may be used to provide one or more of the above calculations.

Embodiments of the present invention include code that directs the processor to perform the aforementioned functions. To further illustrate the working of the computer program 490, an exemplary program that performs the sigmaSAD calculation function and the divisor calculation function is illustrated as follows:

```
// Beginning of the program
int CMp4dll::rate_control(
        int    num_mblk,       // number of macroblocks per picture
        int    BPF,             // channel bit rate divided by frame rate
        int    fbits,           // bits used to code previous frame
int     index,// buffer content, quantitized to 4 bits
        int    *Q,              // quantization factor
        int    first_p,         // first P-frame
        int    num_intra_mblk  // number of intra MB in this picture
        int    sad_avg)         // counter for scheduled MB refresh
{       int    divindex;        // index for divisor[0 . . . 15]
        int    skip;            // indicator to skip a frame (buffer full)
        int    stuff;           // indicator to stuff bits (buffer empty)
    // We define a bit rate threshold applied to the average bit
    // rate generated in the previous four frames. If we are below
    // the first threshold, we defer any complexity adjustment that
    // would tend to further reduce bit rate.
    // Similarly, if we are above this threshold we defer any
    // complexity changes that would increase bit rate.
    int    bitrate;             // sum of the four values
    int    limit;               // sets limit on rate of filling the buffer;
    int    ij,status;
    status = 0;                 // default - not I-frame, no stuff, no skip
    if( BPF!= oldbpf)
    {
j=64;
    for(i = 0; i<16;i++)
    {
        divisor[i] =j;
        j += (BPF/divfactor);
    }
    oldbpf = BPF;
    }
int divisortemp[16] = {64,96,112,128,136,144,152,160,168,176,184,192,
200,216,232,264};
#ifdef DEBUG
    printf("BPF=%d,fbits=%d,index=%d,Q=%d,first_p=%d,
num_intra_mblk=%d,sad_avg=%d\n",
    BPF,fbits,index,*Q,first_p,num_intra_mblk, sad_avg);
#endif
```

```
threshold = (num_mblk<<1)/3;
// Check if should be I picture
if (num_intra_mblk > threshold)
{
    status = 1;
    return (status);
}
if(first_p)
{
    for (i=0;i<4;i++)
        bits[i] = BPF;
}
if(first_p)      //indicates I-frame has just been co
{
    // initialize this number at every I-frame
    if(BPF > 0x1000)
        complexity = 0x80;
    else
        complexity = 0x60;
    first_p = 0;
}
else
{
    bits[n] = fbits;       // four element array
    n++;
    n &= 3;
}
// Conceptually we determine the Q value for the current frame
// by the integral of the M.E. SAD (ssad) values. These values are
// interpreted differently with different image complexities.
// The current buffer fullness only revises our estimate of
// the scene complexity.
// "sad_avg" - sigma SAD, the average MB SAD value over the
// frame. "index" = buffer content / 4096, 0 to 15, used as a selector
// in the case statement, which modifies "complexity".
// "complexity" - 0 to 255, a measure of the spatial data content
// of the image being coded. With larger complexity a
// given SAD value will generate fewer bits. Controlled
// by buffer fullness with a long time constant.
// Initiailized after coding an I-frame.
// "divindex" = complexity / 16, used as an index to divisor[],
// takes values from 0 to 15
// "divisor[]" - an array that defines 16 relationships between
// image complexity and SAD integral. 64 --> 264
// "stuff" - a command to insert stuffing bits
// "skip" - a command to skip the next scheduled frame coding
if(index < 0)
    index = 0;
if(index > 15)
    index = 15;
bitrate = 0;
for (i=0;i<4;i++)
    bitrate += bits[i];
bitrate >>= 2;         // av. bits/frm over last 4 frames
// We impose an immediate complexity correction when the average
// P-frame bit rate over the previous four frames exceeds 10,240 bits
// per frame (1.6 times the nominal rate). The limit declines linearly
// with respect to buffer fullness to 8448 bpf(1.32 x) when the buffer
// is more than half full.
if(index < 8)
    limit = (96 * BPF) >> 6;    // 1.5 * BPF
else
    limit = ((39 - index) * BPF * 3) >> 6;
if (bitrate > limit)
    complexity -= 16;           // reduces divindex by one
stuff = 0;
skip = 0;
switch (index)
{
    case 0:                      // buffer almost empty
        if (bitrate < BPF)
            complexity += 64;
        stuff = 1;
        break;
    case 1:
        if (bitrate < BPF)
            complexity += 32;
        stuff = 1;
        break;
```

```
            case 2:
                if (bitrate < BPF)
                    complexity += 24;
                break;
            case 3:
                if (bitrate < BPF)
                    complexity += 16;
                break;
            case 4:
                if (bitrate < BPF)
                    complexity += 8;
                break;
            case 5:
                if (bitrate < BPF)
                    complexity += 4;
                if (bitrate > BPF)
                    complexity -= 4;
                break
            case 6:
                if (bitrate < BPF)
                    complexity += 4;
                if (bitrate > BPF)
                    complexity -= 4;
                break;
            case 7:
                if (bitrate > BPF)
                    complexity -= 4;
                break;
            case 8:
                if (bitrate > BPF)
                    complexity -= 8;
                break;
            case 9:
                if ((*Q < 31) && (bitrate > BPF))
                    complexity -= 12;
                break;
            case 10:
                if ((*Q < 31) && (bitrate > BPF))
                    complexity -= 16;
                break;
            case 11:
                if ((*Q < 31) && (bitrate > BPF))
                    complexity -= 20;
                break;
            case 12:
                if ((*Q < 31) && (bitrate > BPF))
                    complexity -= 24;
                break;
            case 13:
                if ((*Q < 31) && (bitrate > BPF))
                    complexity -= 28;
                break;
            case 14:
                if ((*Q < 31) && (bitrate > BPF))
                    complexity -= 32;
                skip = 1;
                break;
            case 15:        // buffer almost full
                if ((*Q < 31) && (bitrate > BPF))
                    complexity -= 64;
                skip = 1;
                break;
    }
            if (complexity < 0)
                complexity = 0;
            if (complexity >= 256)
                complexity = 240;
            divindex = complexity >>4;
            *Q = sad_avg / divisortemp[divindex] + 1;
            if (*Q < 2)
                *Q = 2;
            if (*Q > 31)
                *Q = 31;
#ifdef DEBUG
    printf("Chose Q=%d, complexity=%d,divindex=%d,recent avg bits/
        frame=%d\n", *Q,complexity,divindex,bitrate);
#endif
    if (stuff)
        status = 2;
```

```
    if (skip)
        status = 3;
//      printf("index %2d cmplx %3d sad %5d Q %2d stat
%d\n",index,complexity,sad_avg,*Q,status);
    return (status);
}
// End of the program
```

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A method for processing digital video signals for live video applications, the method comprising:

providing video data comprising a plurality of frames;

identifying a first frame and a second frame in the frame sequences;

processing information of the first frame and information of the second frame to determine a quantization step value for the second frame; and adjusting a transmission bit rate for the second frame in response to the quantization step value, wherein the processing the information of the first frame and the information of the second frame comprises:

calculating a sigmaSAD value for the second frame;

calculating a divisor value for the second frame; and calculating the quantization step value for the second frame;

and wherein the calculating a divisor value comprises:

selecting a series of integers that is indexed from 0 through n−1;

selecting a complexity integer;

calculating the quotient modulo n of the complexity integer; and setting the divisor value equal to an integer whose index in the series equals the quotient;

wherein n is an integer larger than 1.

2. The method of claim 1 wherein the providing video data comprises:

assigning compression modes to the frames.

3. The method of claim 2 wherein the compression modes are selected from a group comprising I-mode, P-mode, and B-mode.

4. The method of claim 1 wherein the calculating a sigmaSAD value comprises:

calculating a SAD value for each microblock of the second frame;

storing the SAD value in a memory unit for each microblock of the second frame;

calculating the sum of all the SAD values for the second frame; and dividing the sum by the total number of microblocks of the second frame.

5. The method of claim 1 wherein the selecting the complexity integer comprises:

if the second frame is an I-frame, setting the complexity integer near midrange between an integer A and an integer B; and if the second frame is not an I-frame, adjusting the complexity integer so that the fullness of a buffer varies toward a predefined fullness level.

6. The method of claim 1 wherein the processing the information of the first frame and the information of the second frame comprises:

deciding whether to encode a frame in the I-mode before any P-frame encoding is accomplished.

7. The method of claim 1 wherein the processing comprises:

adjusting the complexity integer so that the size of encoded data for any one of the plurality of frames has approximately an equal size.

8. The method of claim 1 wherein the method for processing digital video signals further comprises:

determining the locations of I-frames in the step of providing video data;

extending frames immediately preceding the I-frames for one additional frame time; and skipping frames immediately following the I-frames.

9. A method for processing digital video signals for live video applications, the method comprising:

providing video data comprising a plurality of frames;

identifying a first frame and a second frame in the frame sequences;

processing information of the first frame and information of the second frame to determine a quantization step value for the second frame; and adjusting a transmission bit rate for the second frame in response to the quantization step value, wherein the processing the information of the first frame and the information of the second frame comprises:

calculating a sigmaSAD value for the second frame;

calculating a divisor value for the second frame; and calculating the quantization step value for the second frame;

wherein the calculating the quantization step value comprises setting the quantization step value equal to the sum of the ratio of the sigmaSAD value to the divisor value and a constant equal to 1.

10. A system including a processor for processing digital video signals for live video applications, the system comprising:

a memory unit within which a computer program is stored, the computer program comprising:

code that instructs the processor to receive video data comprising a plurality of frames;

code that directs the processor to identify a first frame and a second frame in the frame sequences; and code that directs the processor to process the information of the first frame and the information of the second frame to determine a quantization step value for the second frame, wherein the code that directs the processor to process the information of the first frame and the information of the second frame comprises:

code that calculates a sigmaSAD value for the second frame;

code that calculates a divisor value for the second frame; and code that calculates the quantization step value for the second frame, wherein the code that calculates the divisor value comprises:

code that selects a series of integers that is indexed from 0 through n−1;

code that selects a complexity integer;

code that calculates the quotient modulo n of the complexity integer; and code that sets the divisor value equal to an integer whose index in the series equals the quotient;

wherein n is an integer larger than 1.

11. The system of claim 10 wherein the code that calculates the sigmaSAD value comprises:

code that calculates a SAD value for each microblock of the second frame;

code that stores the SAD value in a memory unit for each microblock of the second frame;

code that calculates the sum of all the SAD values for the second frame; and code that divides the sum by the total number of microblocks of the second frame.

12. The system of claim 10 wherein the code that selects the complexity integer comprises:

code that sets the complexity integer near midrange between an integer A and an integer B if the second frame is an I-frame; and code that adjusts the complexity integer so that the fullness of a buffer varies toward a predefined fullness level if the second frame is not an I-frame.

13. A system for processing digital video signals for live video applications, the system comprising:

a video providing subsystem that provides video data comprising a plurality of frames;

a sigmaSAD calculation subsystem that calculates a value of sigmaSAD; and a divisor calculation subsystem that calculates a value of the divisor, wherein the divisor calculation subsystem comprises:

a subsystem that selects a series of integers that is indexed from 0 through n−1;

a subsystem that selects a complexity integer;

a subsystem that calculates the quotient modulo n of the complexity integer; and a subsystem that sets the divisor value equal to an integer whose index in the series equals the quotient;

wherein n is an integer larger than 1.

14. The system of claim 13 wherein the sigmaSAD calculation subsystem comprises:

a subsystem that calculates a SAD value each microblock of a frame of the plurality of frames;

a subsystem that stores the SAD value in a memory unit for each microblock of the frame;

a subsystem that calculates the sum of all the SAD values for the frame; and a subsystem that divides the sum by the total number of microblocks of the frame.

15. The system of claim 13 wherein the subsystem that selects the complexity integer comprises:

a subsystem that if the second frame is an I-frame, sets the complexity integer near midrange between an integer A and an integer B; and a subsystem that if the second frame is not an I-frame, adjusts the complexity integer so that the fullness of a buffer varies toward a predefined fullness level.

16. The system of claim 13 further comprising:

a quantization step calculation subsystem that sets the quantization step equal to the sum of the ratio of the value of sigmaSAD to the value of the divisor, and a constant.

* * * * *